(12) United States Patent
Freeman et al.

(10) Patent No.: US 9,814,253 B2
(45) Date of Patent: Nov. 14, 2017

(54) SYSTEM AND METHOD FOR PREPARING MICRO-INGREDIENT FEED ADDITIVES TO ANIMAL FEED RATIONS

(71) Applicant: Animal Health International, Inc., Greeley, CO (US)

(72) Inventors: Steve Freeman, Windsor, CO (US); Joshua A. White, Thornton, CO (US)

(73) Assignee: Animal Health International, Inc., Greeley, CO (US)

(*) Notice: Subject to any disclaimer, the term of this patent is extended or adjusted under 35 U.S.C. 154(b) by 496 days.

(21) Appl. No.: 14/589,284

(22) Filed: Jan. 5, 2015

(65) Prior Publication Data

US 2015/0190769 A1 Jul. 9, 2015

Related U.S. Application Data

(60) Provisional application No. 61/924,628, filed on Jan. 7, 2014.

(51) Int. Cl.

| | |
|---|---|
| *B01F 15/04* | (2006.01) |
| *A23K 1/18* | (2006.01) |
| *B01F 13/10* | (2006.01) |
| *B01F 15/00* | (2006.01) |
| *B01F 3/18* | (2006.01) |
| *A23K 40/00* | (2016.01) |
| *A23K 20/174* | (2016.01) |

(Continued)

(52) U.S. Cl.
CPC .............. *A23K 1/18* (2013.01); *A23K 20/174* (2016.05); *A23K 20/189* (2016.05); *A23K 20/30* (2016.05); *A23K 40/00* (2016.05); *A23K 50/00* (2016.05); *A23K 50/10* (2016.05); *A23K 50/75* (2016.05); *B01F 3/18* (2013.01); *B01F 13/1066* (2013.01); *B01F 15/00961* (2013.01); *B01F 15/0445* (2013.01); *A23K 20/20* (2016.05); *B01F 2215/0008* (2013.01)

(58) Field of Classification Search
CPC ....................... B01F 15/00311; B01F 15/0445
USPC .......................................... 366/181.1, 181.3
See application file for complete search history.

(56) References Cited

U.S. PATENT DOCUMENTS

| | | |
|---|---|---|
| 4,733,971 A | 3/1988 | Pratt |
| 4,815,042 A | 3/1989 | Pratt |

(Continued)

*Primary Examiner* — David Sorkin
(74) *Attorney, Agent, or Firm* — Brent P. Johnson; Berg Hill Greenleaf Ruscitti, LLP

(57) ABSTRACT

A method and system are provided for preparing micro-ingredient feed additives for use in designated feed rations. A micro-ingredient system of the invention includes a plurality of bins that store designated micro-ingredients therein. A master controller of the delivery system provides signals to control system components based on programmed commands corresponding to micro-ingredient batches to be prepared. Slide gate mechanisms are used to prevent loss of micro-ingredients delivered to a receiving receptacle of the system. During delivery of the micro-ingredients to the receptacle and during processing, the micro-ingredients can become airborne and subsequently lost. The slide gate mechanisms also provide controlled access to the receiving receptacle to prevent system errors such as contamination of ingredients in the receptacle, or improper batching of a prescribed micro-ingredient mixture to be delivered to a designated feed ration.

15 Claims, 13 Drawing Sheets

(51) Int. Cl.
*A23K 20/189* (2016.01)
*A23K 50/00* (2016.01)
*A23K 50/10* (2016.01)
*A23K 50/75* (2016.01)
*A23K 20/20* (2016.01)

(56) References Cited

U.S. PATENT DOCUMENTS

| | | | |
|---|---|---|---|
| 4,889,443 A | | 12/1989 | Billings |
| 5,219,224 A | | 6/1993 | Pratt |
| 5,230,476 A | * | 7/1993 | Rust ................ B02C 21/02 241/101.6 |
| 5,487,603 A | | 1/1996 | Hoff et al. |
| 5,634,716 A | * | 6/1997 | Westall ............ B01F 13/0016 366/141 |
| 8,277,111 B1 | * | 10/2012 | Englot ............... B01F 5/043 366/138 |
| 2005/0024988 A1 | * | 2/2005 | Hoff ................... A01K 5/0216 366/141 |
| 2007/0280041 A1 | * | 12/2007 | Adent ................ A01K 5/02 366/183.1 |

* cited by examiner

SYSTEM AND METHOD FOR PREPARING MICRO-INGREDIENT FEED ADDITIVES TO ANIMAL FEED RATIONS

CROSS REFERENCE TO RELATED APPLICATIONS

This application claims the benefit of priority under 35 U.S.C. 119(e) from U.S. Provisional Application No. 61/924,628 filed on Jan. 7, 2014, which is incorporated herein by reference in its entirety.

FIELD OF THE INVENTION

The invention relates to micro-ingredients added to feed rations for animals such as livestock, and more particularly, to a system and method for preparing micro-ingredient feed additives including selectively operable slide gates communicating with a mixing tank of the system to control loss of micro-ingredients and to prevent inadvertent errors in preparing micro-ingredient mixtures to be added to designated feed rations.

BACKGROUND OF THE INVENTION

Dietary supplements and medications are well known for use in animal feed rations in the livestock and poultry industries. These supplements and medications may include vitamins, mineral, enzymes, hormones, antibiotics and others.

The manner in which these supplements are combined with a consumptive fluid carrier such as water is disclosed in a number of patents to include the U.S. Pat. Nos. 4,889,443; 4,815,042; 4,733,971; 5,219,224; and 5,487,603. These references generally disclose automated systems that dispense discrete amounts of micro-ingredients, combine the micro-ingredients to create a slurry mixture, and then deliver the slurry mixture to a feed ration. These micro-ingredients are typically added to the animal feed rations using mixing or spraying methods.

For organizations that add pharmaceuticals to animal feed supplements, these organizations may be subject to the regulations of a government agency such as the Food and Drug Administration (FDA). Such organizations may be inspected by FDA personal, and are subject to various reporting requirements. Therefore, it is imperative that equipment used in the processes of making animal feed rations be capable of accurately and precisely accounting for quantities of the micro-ingredients used.

One method for measuring the amount of a micro-ingredient to be used in a designated ration is use of one or more weigh scales that weigh the amount of each micro-ingredient delivered to the ration. The weight measurement may be achieved in various methods such as measurement of loss in weight or measurement of gain in weight. Loss in weight refers to measuring the weigh loss of a particular bin that has dispensed the micro-ingredient, the loss in weight corresponding to the amount of the micro-ingredient dispensed from the bin. Gain in weight refers to measuring the amount of a micro-ingredient delivered to a receiving container, the increase in weight corresponding to the amount of the micro-ingredient delivered to the receiving container. Another method of measuring the amount of a micro-ingredient that has been dispensed is measurement by volume. It is known that certain delivery mechanisms such as an auger have the capability to accurately and precisely dispense a known quantity of a micro-ingredient over a period of time. Thus, measurement of a delivered micro-ingredient can be determined on a volumetric basis wherein an amount delivered is determined by the length of time that the delivery mechanism is activated. Volume measurement is particularly useful with respect to measurement of liquid micro-ingredients.

Despite the accuracy and precision of the machines that deliver the micro-ingredients, and despite the improved computer processing equipment that may be used to calculate required amounts and to record deliveries to designated feed batches, errors can still be made in delivering the micro-ingredients to the designated feed ration. One type of error that can occur despite the above-mentioned improvements is the simple failure to load the designated storage bin with the correct micro-ingredient. For each micro-ingredient used in an automated micro-ingredient delivery system, each bin must be pre-designated to hold a specified micro-ingredient so that the correct types and amounts of the micro-ingredient are dispensed once the automated delivery sequence begins. The micro-ingredient bins and the delivery devices connected thereto, such as augers and pumps, do not have the inherent capability to distinguish between loaded micro-ingredients. Rather, the bins are simply sized to hold a designated quantity of whatever ingredient is loaded therein, and the delivery devices operate to dispense designated amounts of the ingredients from the bins as instructed by commands generated from a controller. The commands may be based on a timed delivery, or based on loss in weight or gain in weight methods.

Another error that can be created in the preparation of a feed ration having micro-ingredients is the loss of such ingredients as airborne particles that are not delivered to and/or do not remain within the receptacle used to mix the ingredients. Particularly for pharmaceuticals that may have a very small volume as compared to the other micro-ingredients used, loss of pharmaceuticals as airborne particles may result in an improper micro-ingredient mixture. For example, when the micro-ingredients are initially delivered to the mixing receptacle and during mixing, a measurable amount of a pharmaceutical can potentially become airborne and subsequently lost. If the pharmaceutical is dropped from a bin or container into the mixing receptacle, a certain portion of the pharmaceutical may become airborne particles. Further, a pharmaceutical delivered to a mixing receptacle as one of the last ingredients will initially reside on top of the micro-ingredient mixture, and some of the pharmaceutical can become airborne particles in an uncovered receptacle subject to a moving airstream.

One object of the invention is to minimize loss of micro-ingredients that may be prone to becoming airborne particles.

Another object of the invention is to provide a micro-ingredient preparation system and method wherein inadvertent errors can be minimized by use of slide gate mechanisms that control access to a mixing tank used to mix micro-ingredients. A controller of the system determines operation of the slide gates. An appropriate remedial action can be specified by the controller in response to a particular alarm condition or system malfunction with respect to ingredients that are to be added to the mixing tank for designated micro-ingredient mixtures.

In all of the foregoing objects, a micro-ingredient delivery system and method is provided that still provides an accurate and precise means of delivering the micro-ingredients, yet the system is made even more reliable by preventing potential loss of micro-ingredients and preventing improper micro-ingredient mixtures.

SUMMARY OF THE INVENTION

In accordance with the invention, a system and method are provided for preparing micro-ingredient feed additives to animal feed rations. Features are provided for preventing the loss of micro-ingredients, and also to prevent inadvertent errors in different types of micro-ingredients added to a micro-ingredient batch for subsequent delivery to a designated feed ration. The system includes a number of storage bins that hold quantities of dry micro-ingredients. Access is provided to the interior of each bin, such as a top cover or lid that enables micro-ingredients to be added to the respective bins. A delivery device is associated with each bin in order to dispense the micro-ingredients from the bin to a receiving receptacle, such as a mixing tank, for preparation of the micro-ingredient batch. One common example of a micro-ingredient batch includes the dry micro-ingredients combined with an amount of water to produce a micro-ingredient slurry. The system also contemplates addition of liquid micro-ingredients to a batch, in which liquid micro-ingredients may be added to the receiving receptacle by a delivery line which communicates with the interior of the receiving receptacle.

The bins are periodically loaded with micro-ingredients to satisfy daily feed calls, which are the daily requirements for adding the micro-ingredients to feed rations for the location at which the micro-ingredient system is installed and operating. One example of a location is a feed mill in which feed rations are prepared. The feed mill may include a number of micro-ingredient machines and feed mixers. System operators must load each bin with the correct amount and type of micro-ingredient(s) as required according to each pre-determined micro-ingredient batch. Each pre-determined micro-ingredient batch is then delivered to a designated feed ration.

One type of loss that can occur for micro-ingredients to be delivered to a feed ration is loss by the micro-ingredients remaining as suspended airborne particles. Particularly for micro-ingredients that may have a very small volume as compared to the micro-ingredient batch or mixture as a whole, such as pharmaceuticals, it is important that all of the micro-ingredients of this type remain within the micro-ingredient mixture since loss of even a small amount can result in an improperly prepared micro-ingredient mixture. Because some of the micro-ingredients may be in the form of fine powders, when delivered to the receiving receptacle, these micro-ingredients become easily airborne and may be suspended for a significant period of time. In order to address this shortcoming, the invention includes slide gate mechanisms that are mounted on the top cover of the receiving receptacle. When each micro-ingredient is added from a bin, the slide gate is operated to open such that the micro-ingredient can drop from the dispensing device associated with the bin into the receiving receptacle. After the designated amount of the micro-ingredient has been dropped from the dispensing device into the receiving receptacle, the slide gate will close thereby trapping the added micro-ingredient in the receiving receptacle. One slide gate is associated with each of the bins such that each micro-ingredient added to the receiving receptacle will become trapped or sealed within the receiving receptacle shortly after the micro-ingredient is added to the receiving receptacle. In a typical micro-ingredient delivery sequence, the micro-ingredients can be delivered sequentially so that only one of the slide gates are open at any particular time, thereby minimizing the open space into the receiving receptacle, and thereby reducing the amount of micro-ingredients that could escape through an open slide gate. After the micro-ingredients have been added to the receiving receptacle, the micro-ingredients can be mixed, and an appropriate amount of liquid can be added to create a slurry mixture if the recipe for the micro-ingredient batch calls for a liquid to be added. In the event the micro-ingredients are to be kept as a dry mixture, the closed slide gates prevent the propagation of airborne particles, and thereby ensure that the micro-ingredients are not lost. Even when a liquid is added to create a story mixture, a significant amount of the dry micro-ingredients can be propelled airborne during the mixing sequence of the batch preparation. Accordingly, the closed slide gates are particularly advantageous for preventing loss of airborne micro-ingredients.

Another advantage of the system and method is to assist in preventing inadvertent errors associated with adding micro-ingredients to the receiving receptacle. Each of the micro-ingredient batches to be prepared is determined by a recipe mix in which desired amounts of the micro-ingredients are to be delivered to the receiving receptacle. In the event of a malfunction of the system, or an inadvertent error by a system operator, the slide gates can be programmed to be responsive to alarm conditions corresponding to the system malfunctions and operator errors. For example, in the event a dispensing device it associated with one of the bins malfunction such that an insufficient or excess amount of a micro-ingredient is delivered to the receiving receptacle, the corresponding slide gate mechanism can be programmed to automatically close when the system detects the malfunction so that no additional micro-ingredients can be added to the micro-ingredient batch until the malfunction is rectified. In another example, in the event an operator loads an incorrect type of micro-ingredient to a bin, and this error is not detected by the weighing device associated with the bin (such as when an operator loads an incorrect micro-ingredient having a very similar density as compared to the correct micro-ingredient), this error may be detected by the increased or decreased amount of time in which it takes the dispensing device to dispense the micro-ingredient. In such case, the associated slide gate could automatically close when the system detects a delivery sequence of the micro-ingredient from the dispensing device that is not within a designated time parameter. The automatic closing of the slide gate they provide a pastor response in terms of preventing further improper ingredients added to the receiving receptacle as compared to simply stopping the operation of the dispensing device, in which residual amounts of the improper micro-ingredient may continue to be delivered to the receiving receptacle. Therefore in this aspect of the invention, the slide gates operate as automatic isolating features that prevent access to the interior of the receiving receptacle until the alarm condition has been remedied.

A controller is used to control operation of the system to include basic functioning of each of the components of the system. One arrangement of the controller may include the use of a programmable logic controller (PLC) with input/output modules that receive signals as to the state of a field device, and send control signals to the field devices in order to execute a program sequence of operation for the system. The PLC may communicate with another computing device that interfaces with the PLC for purposes of monitoring the status of the system and to load the PLC with the desired micro-ingredient programming. For example, the other computing device may send mixing and batching instructions to the PLC. The computing device may also be connected to an external animal management control system in which instructions for micro-ingredient batches are generated from the external management system to include instructions as to which micro-ingredient batches require preparation for delivery to designated feed rations for a designated facility. In one example, the external management control system may include a feed yard management system that generates daily instructions as to the feed rations that must be prepared and delivered to a selected feed bunks within the facility. This external management control system would therefore send instructions to the remote personal computing device connected to the PLC. The system operator would then execute the necessary actions to activate the PLC to execute the required batching programs necessary to fulfill the orders originating from the external management control system.

The system includes a self-contained group of components that may be housed within a mobile cart or cabinet. Accordingly, the system can be easily transported from one location to another within a facility. Once a location is selected for installation, the wheels of the mobile cart can be removed. The system may be set on vibration dampening pads when installed. The system itself includes a plurality of micro-ingredient bins with integral dispensing devices for each been that allows micro-ingredients to be delivered to a receiving receptacle which is located in close proximity to the dispensing devices. A slide gate can be provided for each dispensing device. The slide gates are positioned below the points where the micro-ingredients fall from the dispensing devices, and the slide gates providing an opening large enough to allow the micro-ingredients to be added to the receiving receptacle without interference. The receiving receptacle may include an integral mixer for mixing of the micro-ingredients. One or more fluid lines may communicate with the mixing tank allowing a designated liquid such as water to be added to the micro-ingredients for preparation of a slurry mixture. One or more pumps may be used to pump the slurry mixture of micro-ingredients from the receiving receptacle to a feed ration held within another receptacle, or another location such as a feed truck or feed bin.

Considering the above features of the invention, in one aspect, it may be considered a system for preparing micro-ingredients to be used in designated feed rations, said system comprising: (i) at least one bin for holding a micro-ingredient therein, said bin having an opening for receiving the micro-ingredient; (ii) a dispensing device communicating with the at least one bin for dispensing the micro-ingredient from the at least one bin; (iii) a receiving receptacle for receiving the micro-ingredient dispensed; (iv) a slide gate mechanism mounted to the receiving receptacle, the slide gate mechanism having a gate being operable between a closed position and an open position, the open position defining an opening through the mechanism enabling a micro-ingredient to be transferred from the dispensing device into the receiving receptacle, and the closed position defining a closure of the mechanism to prevent the micro-ingredient from being transferred from the dispensing device into the receiving receptacle; and (v) a controller communicating with said dispensing device and said slide gate mechanism, said controller including a micro-processor, computer coded instructions determining operation of the system, and an interface for placing said slide gate mechanism between the open and closed positions based on commands of said computer coded instructions resulting in output control signals sent to said slide gate mechanism.

Other aspects of the system may include: (i) wherein said controller comprises a PLC; (ii) wherein micro-ingredient recipes are used to determine (a) which micro-ingredients are to be added to the receiving receptacle, (b) quantities of the micro-ingredients to be added, and (c) how the micro-ingredients are to be processed prior to delivery to a designated feed ration, and said micro-ingredient recipes being programmed in said computer coded instructions for execution by said micro-processor resulting in said output signals being generated; (iii) wherein said system includes at least two bins and each bin having a corresponding dispensing device for dispensing micro-ingredients through said slide gate mechanism oriented below the dispensing devices; (iv) wherein said system includes at least two bins, each bin having a corresponding bin cover that covers access to an open top of each bin, each bin cover rotatably mounted between the at least two bins, wherein opening of either of said bin covers orients said opened bin cover to extend upward and thereby partially blocking access to the other bin; (v) wherein a weighing element associated with each bin and communicating with said controller to determine the weight of each bin during operation; (vi) wherein said weighing element includes a load cell mounted to its corresponding bin for generating signals to said controller to determine the weight of said bin; (vii) wherein at least one pump and associated fluid conveying lines communicating with said receiving receptacle for transferring fluid into said receiving receptacle, and for transferring micro-ingredients combined with said fluid as a micro-ingredient recipe from said receiving receptacle for subsequent use in a designated feed ration; (viii) wherein at least one pump and associated fluid conveying lines communicating with said receiving receptacle for transferring fluid into said receiving receptacle, and for transferring said fluid from said receiving receptacle during a cleaning cycle to clean an interior of the receiving receptacle after preparation of a micro-ingredient recipe in said receiving receptacle; (ix) wherein at least one nozzle disposed within said receiving receptacle and communicating with said fluid conveying line to distribute fluid in said receiving receptacle during cleaning; (x) wherein said receiving receptacle includes a mixing tank and a mixing shaft disposed in said tank for controlled mixing of micro-ingredients in said tank; (xi) wherein said at least one pump includes two pumps arranged in series, and a three-way valve communicating with said pumps for selective conveying of said fluid; (xii) wherein said slide gate mechanism includes a slidable gate and an actuator controlled by said controller for moving said slidable gate between said open position, and said closed position; (xiii) wherein said slide gate mechanism includes a seal located around a periphery of an opening formed in said frame and covered by said slidable gate when placed in said closed position thereby sealing said slidable gate to said frame; and (xiv) wherein said slide gate mechanism includes (a) a frame, (b) a slidable gate mounted to said frame and slidable along said frame, (c) an actuator controlled by said controller for moving said slide gate mechanism between a first position corresponding to said open position, and a second position corresponding to said closed position, and (d) a top cover mounted on said frame.

In yet another aspect of the invention, it may be considered as a sub-combination of a device for controlling transfer of a dispensed product from a dispensing device, said sub-combination comprising: (i) a dispensing device for dispensing a product to a designated location; (ii) a slide gate mechanism located adjacent the dispensing device, the slide gate mechanism having a gate being operable between a closed position and an open position, the open position defining an opening through the slide gate mechanism enabling the product to be transferred from the dispensing device to the designated location, and the closed position defining a closure of the slide gate mechanism to prevent the product from being transferred from the dispensing device to the designated location; and (iii) said slide gate mechanism comprising (a) a frame, (b) a slidable gate mounted to said frame and slidable along said frame, (c) an actuator for moving said slide gate mechanism between a first position corresponding to said open position, and a second position corresponding to said closed position, and (d) a top cover mounted on said frame.

Other aspects of the sub-combination may include, wherein said slide gate mechanism includes a seal located around a periphery of an opening formed in said frame and covered by said slidable gate when placed in said second position thereby sealing said slidable gate to said frame.

In yet another aspect of the invention, it may include a method for preparing micro-ingredients to be used in designated feed rations, said method comprising: (a) providing: (i) at least one bin for holding a micro-ingredient therein, said bin having an opening for receiving the micro-ingredient; (ii) a dispensing device communicating with the at least one bin for dispensing the micro-ingredient from the at least one bin; (iii) a receiving receptacle for receiving the micro-ingredient dispensed; (iv) a slide gate mechanism mounted to the receiving receptacle, the slide gate mechanism having a slidable gate; (v) a controller communicating with said dispensing device and said slide gate mechanism, said controller including a micro-processor, computer coded instructions determining operation of the system, and an interface for sending output control signals to and receiving input signals from said slide gate mechanism; and (b) operating said slide gate mechanism based on commands from said computer coded instructions resulting in the output control signals sent to said slide gate mechanism, wherein said slidable gate is moved between a closed position and an open position, the open position defining an opening through the mechanism enabling a micro-ingredient to be transferred from the dispensing device into the receiving receptacle, and the closed position defining a closure of the mechanism to prevent the micro-ingredient from being transferred from the dispensing device into the receiving receptacle.

Another aspect of this method may include operating said slidable gate from said open position to said closed position in response to at least one of (a) completed dispensing by said dispensing device of a selected micro-ingredient specified from a micro-ingredient recipe; (b) an alarm condition wherein access to said receiving receptacle is temporarily prevented until said alarm condition is resolved; and (c) processing of micro-ingredients in said receiving receptacle.

Other features and advantages of the invention will become apparent from a review of the drawings in conjunction with the detailed description.

DETAILED DESCRIPTION OF THE INVENTION

FIGS. 1-8 illustrate the micro-ingredient preparation system 10 of the invention. The system 10 is configured to incorporate an integral master controller, such as a PLC 32 that includes a computer processor 33 and at least one user interface, such as a user display 34 for displaying functionality of the system 10 to include various micro-ingredient batch or "recipe" instructions or programs that an operator may select. In this respect, the PLC 34 is therefore intended to represent a standard computing device having the capability to receive user directed inputs and to generate programmed outputs. In the case of a PLC type controller, the PLC 32 receives inputs from the system and generates outputs to the system through an input/output module that communicates with the processor 33. The input/output module may be conceptually defined as an interface between the processor 33 of the controller that allows instructions from a computer program of the PLC to be executed upon components of the system to achieve a directed sequence of operations. A conventional data input device such as a keyboard, mouse, touch screen controls or others (not shown), may be used to provide the operator with the ability to generate command to control the system 10. The PLC 32 as shown include a single user interface, however it is also contemplated that multiple user input devices and user interfaces screens may be used, to include user input devices and interfaces located remote from the system 10 to accommodate user control. In this regard, inputs and outputs from the input/output module may be communicated wirelessly to the computer processor 33. In lieu of a PLC, a general purpose computing device can be used with signal input/output capabilities allowing the processor to send commands/signals to various components of equipment in the system and to receive input signals from the components for evaluation/processing.

Figure 1:
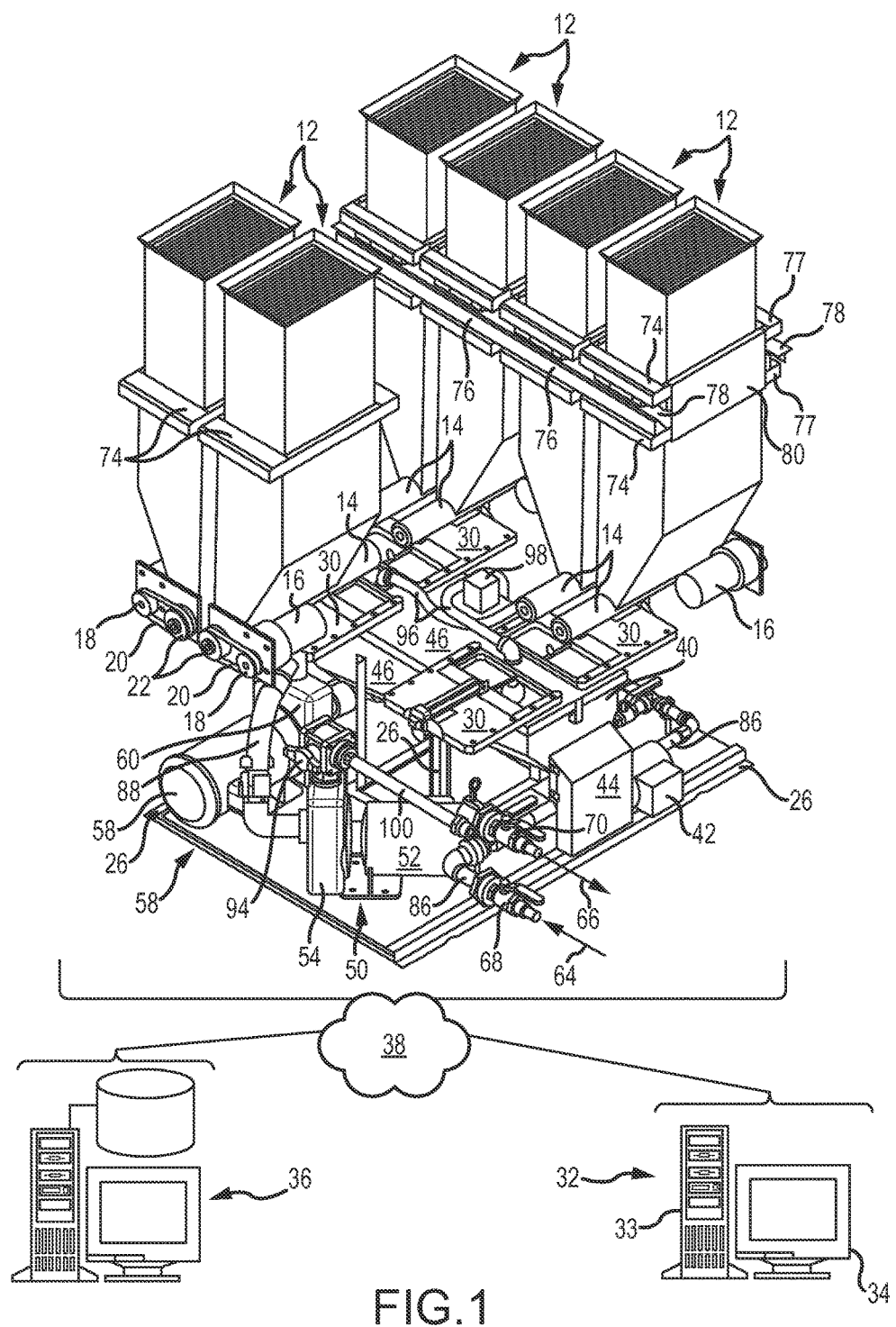
FIG. 1 is a front perspective view of the system.

As also shown in FIG. 1, the PLC 32 communicates with an external animal management system 36, such as an animal management system found in a feed yard or other location in which the system 10 is installed. The external animal management system 36 communicates with the PLC 32 through a communications network 38, such as a local area network, the Internet, or other communication networks. The external animal management system 36 specifies the types of rations that are to be prepared at the facility concerned, to include specifications or guidelines for the particular micro-ingredient batches that should be added to designated feed rations.

Figure 3:
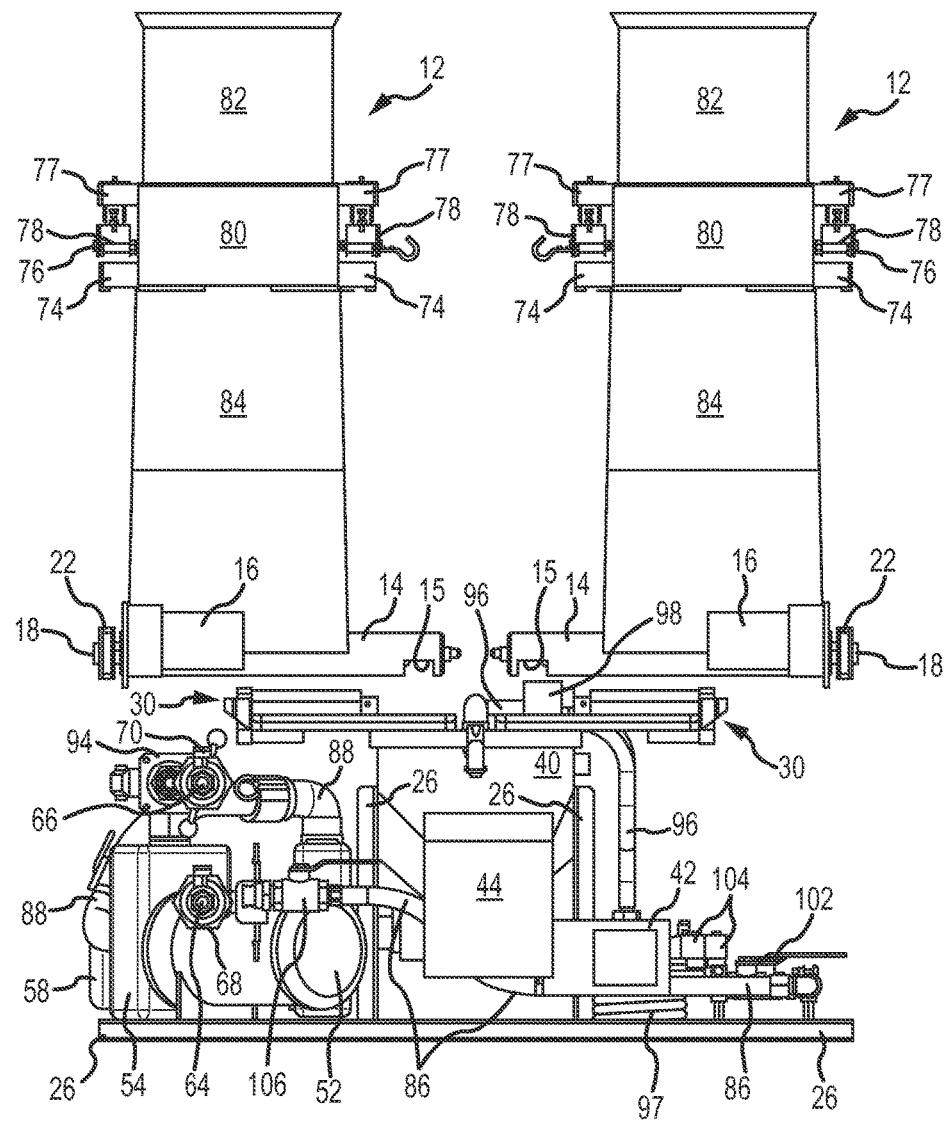
FIG. 3 is a front elevation view of the system.
Figure 4:
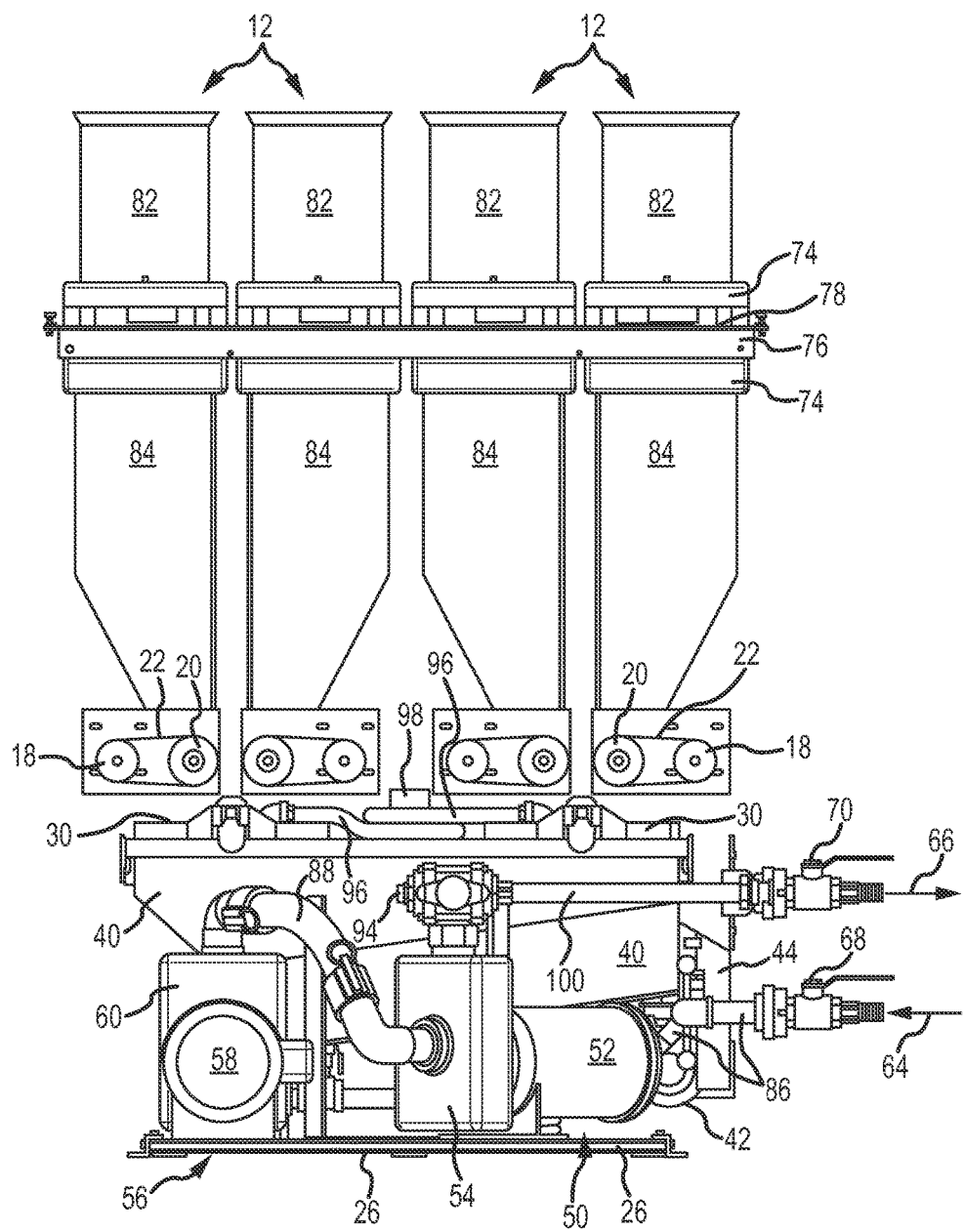
FIG. 4 is a left side elevation view of the system.
Figure 5:
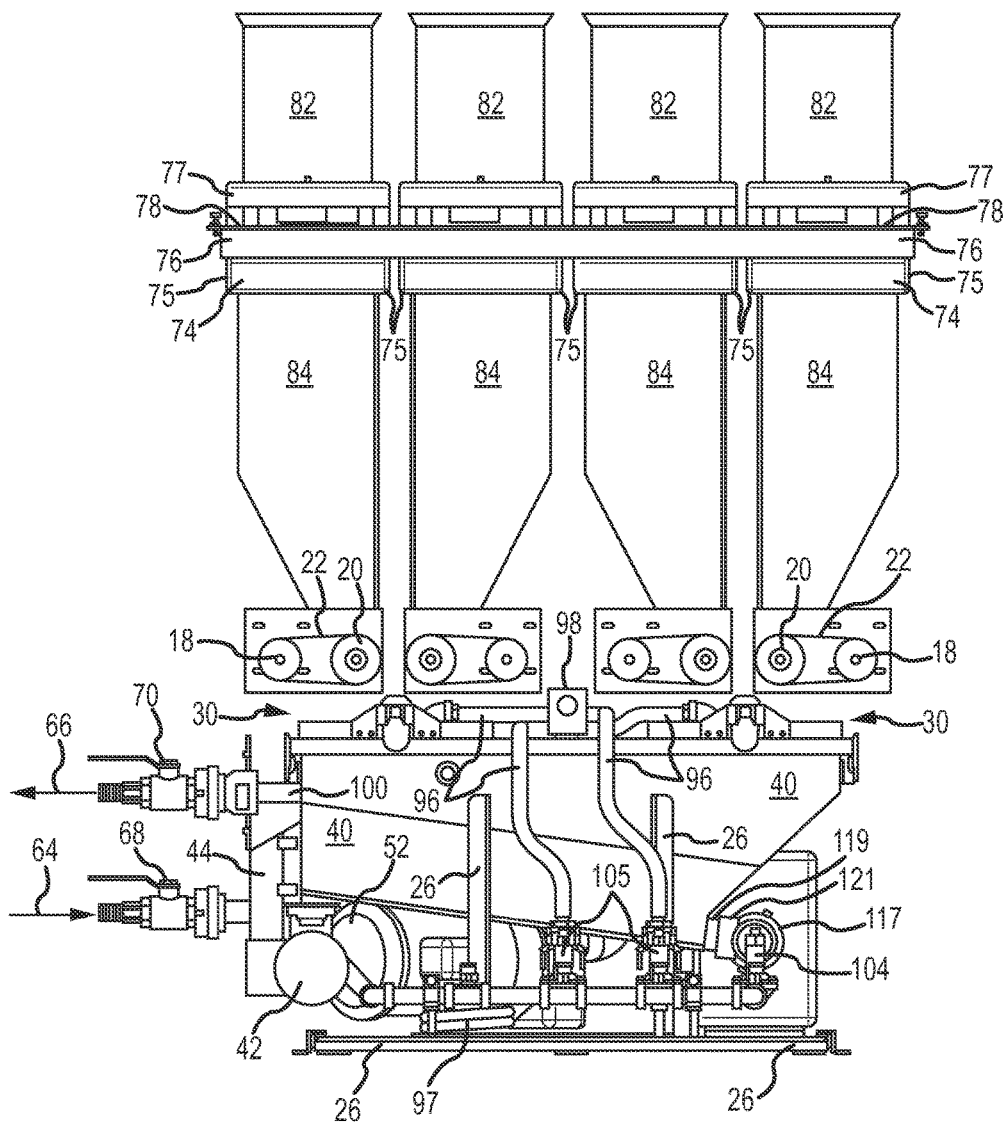
FIG. 5 is a right side elevation view of the system.
Figure 6:
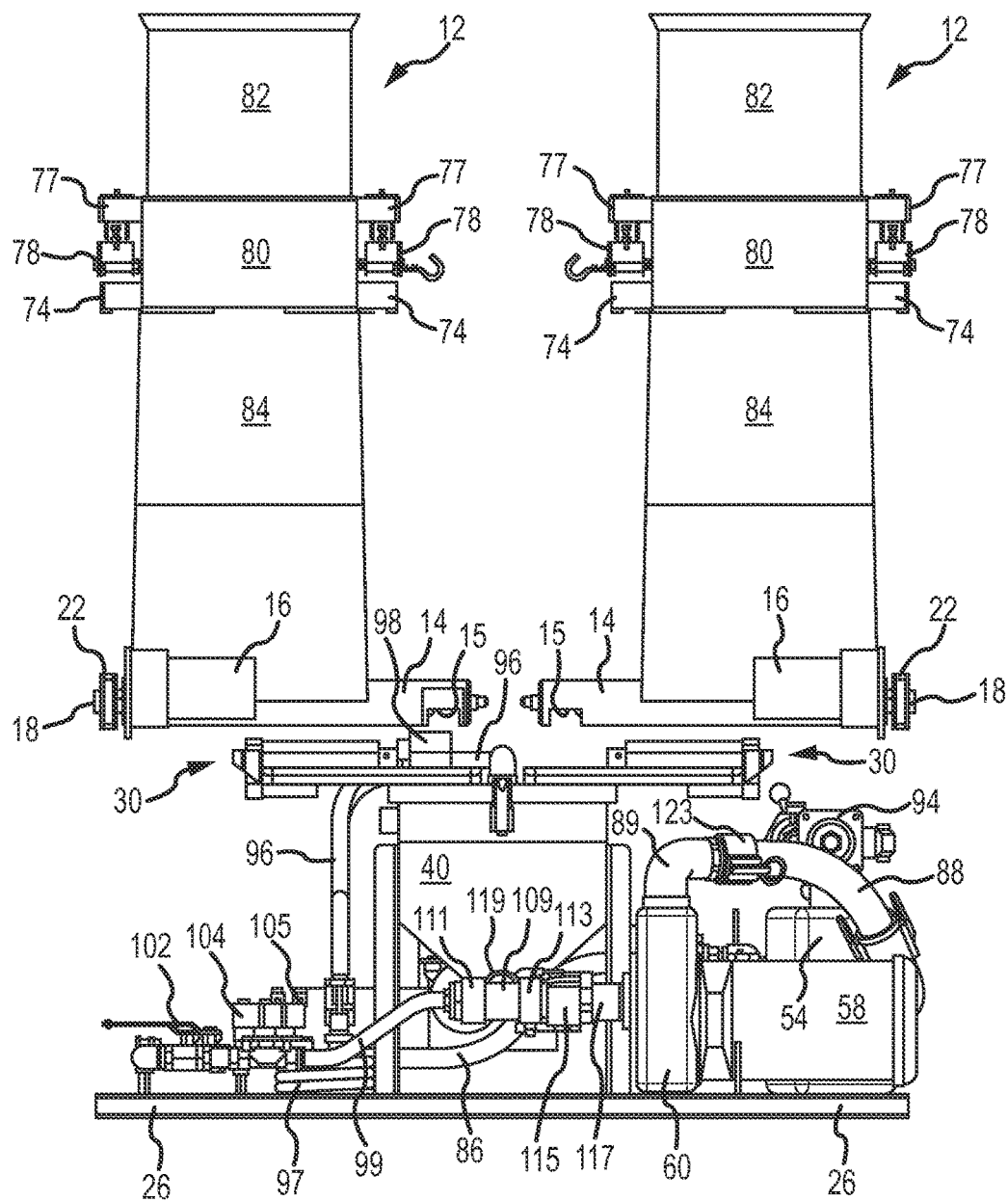
FIG. 6 is a rear elevation view of the system.

The system 10 includes a number of equipment components enabling a wide variety of different micro-ingredients to be combined in a batch, processed, and then delivered to another location, such as a feed truck, feed mixer, or feed bunk within a feed yard. As shown, a plurality of bins 12 are located adjacent to one another, and are arranged to deliver respective micro-ingredients within each bin to a receiving receptacle, shown as a mixing tank 40. The bottom portion of each of the bins 12 incorporates a dispensing device 14 that allows selective and controlled dispensing of micro-ingredients from the bins into the mixing tank 40. In the preferred embodiment illustrated, the dispensing devices 14 are dispensing augers that are disposed horizontally for delivering metered amounts of the micro-ingredients in which the amounts are measured/determined by controlled rotation of the augurs to dispense the micro-ingredients. As shown in FIGS. 3 and 6, each of the dispensing devices 14 includes discharge openings 15 in which the micro-ingredients are allowed to drop from the devices 14 into the mixing tank 40. Each of the augurs is driven by an auger motor 16. As best seen in FIGS. 4 and 5, the auger motors 16 each include a drive sprocket 18 that is driven by the motor. Force is transferred from the drive sprocket 18 to a driven sprocket 20 by a drive belt 22. The driven sprocket 20 is mounted to the corresponding auger for rotating the auger. The motors 16 are selectively activated to cause the augurs to rotate, thus dispensing controlled amounts of the micro-ingredients.

Figure 2:
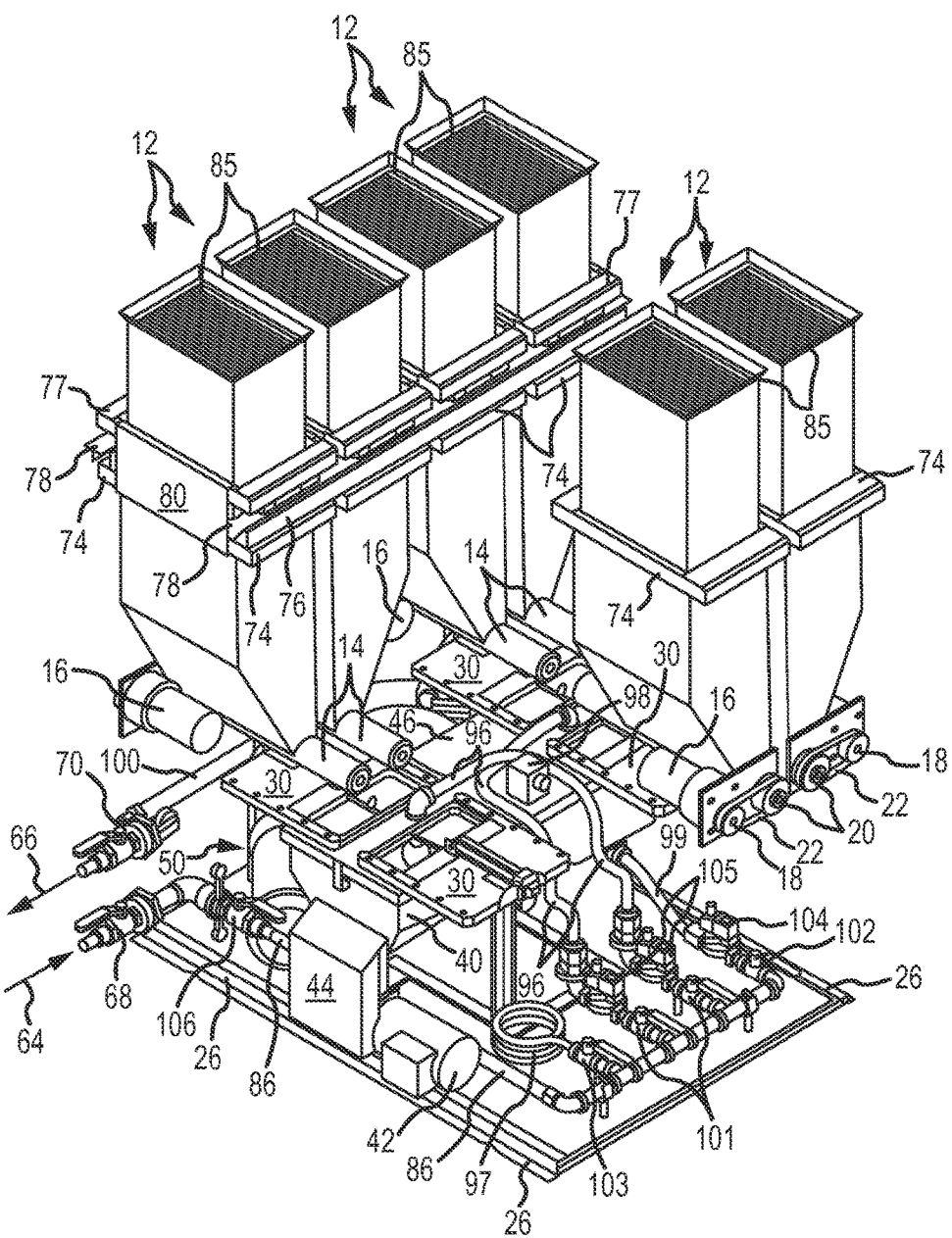
FIG. 2 is another perspective view of the system.
Figure 7:
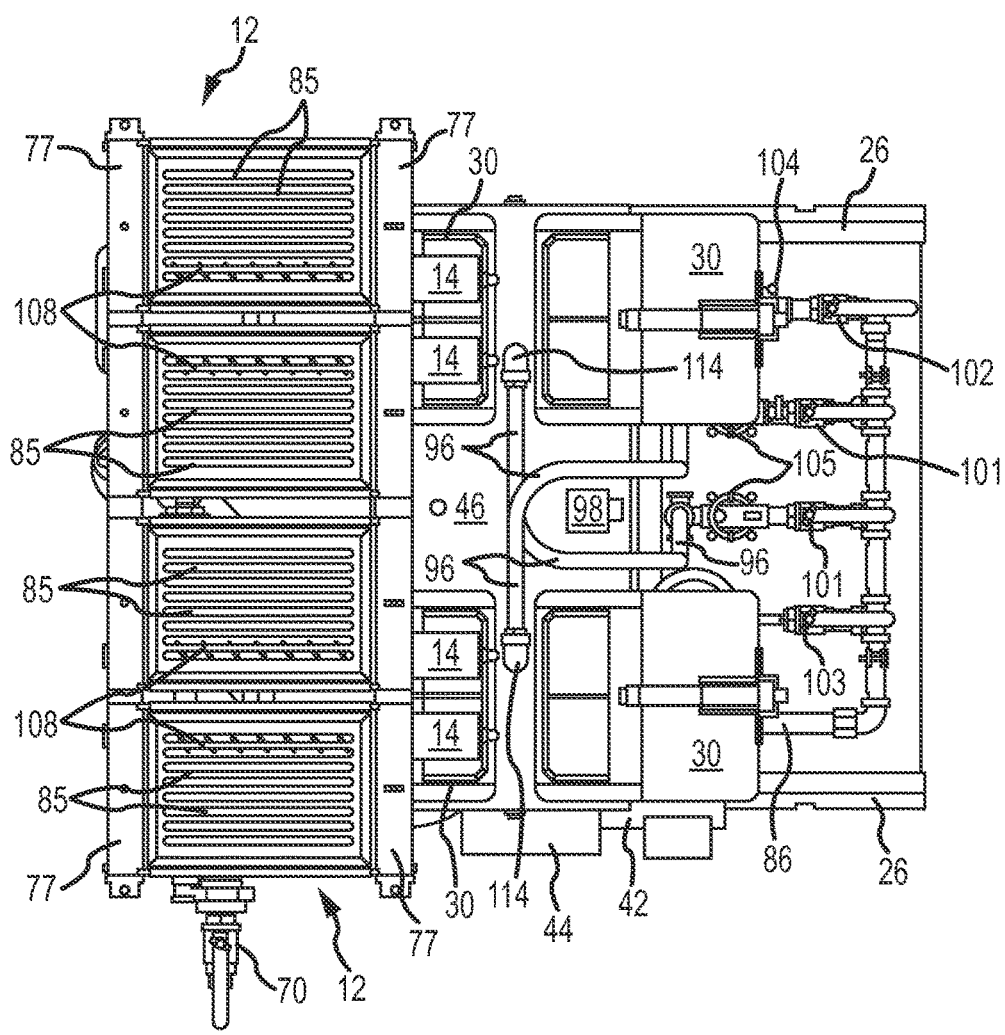
FIG. 7 is a top plan view of the system.

FIGS. 1 and 2 illustrate six bins 12. However, the system 10 is arranged for eight bins, two of the bins being removed from these figures to simplify visualization of the components of the system. Additionally, FIG. 7 is further simplified in the top plan view thereof in which two additional bins 12 are removed to better visualize components the system 10.

Slide gate mechanisms 30 are arranged below the discharge openings 15 of the dispensing devices 14. More specifically, four slide gate mechanisms 30 are illustrated in which a pair of adjacent bins 12 dispenses ingredients through a corresponding opening of the slide gate mechanism into the mixing tank 40. Although each adjacent pair of bins 12 are shown with one corresponding slide gate mechanism, it is also contemplated that each bin may communicate with its own slide gate mechanism for controlling access into the mixing tank. Accordingly in this later configuration, there could be eight slide gate mechanisms used, one for each bin. In the preferred embodiment of FIG. 1, the adjacent pairs of bins 12 in one aspect of the invention could be used to store similar ingredients for a micro-ingredient batch or otherwise compatible micro-ingredients that can be simultaneously dispensed without concern for cross contamination between the ingredients in which there is no need to separately control access into the mixer by a slide gate mechanism for each bin.

Figure 8:
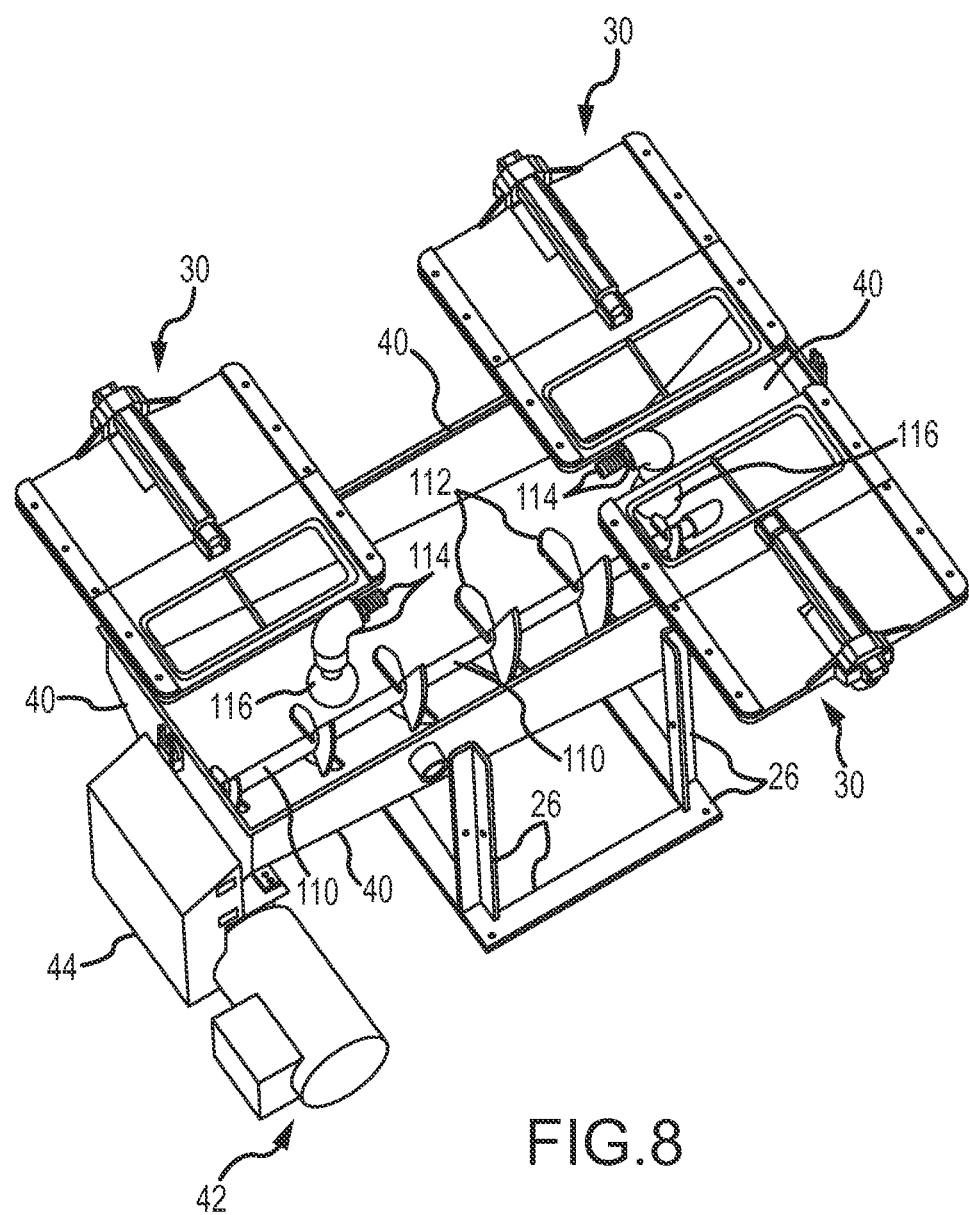
FIG. 8 is a fragmentary perspective view of components of the system including slide gate mechanisms and the mixing tank

A mixing tank motor 42 is used to drive a mixing shaft 110 (FIG. 8). The mixing shaft 110 includes a plurality of spaced mixing impellers 112 that are used to mix the micro-ingredients which are delivered into the mixing tank. The mixing motor 42 may have a drive sprocket (not shown) which transfers force to the mixing shaft 110 by a drive belt (not shown) connected to the mixing shaft, this type of force transferring arrangement being similar to the force transferring arrangement for the auger motors 16. The drive components of the mixing motor (drive belt and sprockets) may be housed within the drive component cover 44 shown as mounted to one end of the mixing tank 40 adjacent the motor 42.

A mixing tank cover 46 covers the upper open end of the mixing tank 40, along with the slide gate mechanisms 30. During operation, the slide gate mechanisms 30 are selectively opened and closed based upon the sequence in which micro-ingredients are dispensed from the augers. A vent 98, illustrated as an element that extends above the cover 46, allows air to escape within the mixing tank during operation.

As micro-ingredients and liquid are added to the mixing tank, pressure will increase within the mixing tank requiring air to be vented during micro-ingredient processing and cleaning of the interior of the mixing tank. Pressure may also increase within the mixing tank if chemical reactions occur by mixing of the micro-ingredients which produce gas. The vent 98 may include a filter element (not shown) to prevent loss of micro-ingredients through the vent into the atmosphere.

The components of the system 10 are supported by a plurality of support members 26, such as angle iron brackets in combination with a base or platform. These support members provides the necessary support and rigidity for the system enabling it to be mounted within a mobile unit or cart, as described further below.

Other components of the 10 include two conveying pump assemblies, shown as a first conveying pump assembly 50 and a second conveying pump assembly 56. It may be desirable to provide redundancy for these pump assemblies for various reasons. In the event of a failure of one of the pump assemblies, the remaining pump assembly could be used without having to shut down the entire system for repair. If it is necessary to selectively increase the conveying pump power or head from the pump assemblies, the provision of two pump assemblies may more easily facilitate this requirement, such as if it becomes necessary to convey the micro-ingredients over a considerable distance through a conveying line to a feed truck or feed bunk. Additionally, for cleaning and flushing operation sequences in which it is necessary to fully clean the interior of the mixing tank and the components exposed to micro-ingredients, it is also advantageous to have a series of pump assemblies in which liquid may be more efficiently evacuated from the mixing tank. The two pumps place in series allows a complementary priming action for the pumps when evacuating the mixing tank from a prepared batch of micro-ingredients and taking in liquid from the tank to supplement conveying of the micro-ingredients downstream.

Each of the pump assemblies include corresponding conveying pump motors, shown as motors 52 and 58. Each of the pump assemblies further include respective pump housings which house the pump impellers for generating pumping force, shown as pump housings 54 and 60. As shown, the pump assemblies are connected in series by a pump connecting line 88. The line 88 connects at one end to the discharge of pump housing 60 and the other end connects to the inlet of pump housing 54. The discharge side of pump housing 54 communicates with pump discharge line 100 which in turn, communicates with manual discharge valve 70 that defines the discharge outlet 66 of the system.

Three-way valve 94 is mounted to the discharge side of the pump housing 54. In the event there is a break down in the feed mill operation, it may be necessary to redirect the slurry mixture to another temporary location. For example, if the slurry mixture was originally directed to a downstream feed mixer and that feed mixer became inoperable, the prepared micro-ingredient mixture/slurry would require re-routing to another location. Accordingly, a temporary outlet hose/line (not shown) could be attached to the open port of the valve 94 (the left side of valve 94 as illustrated in FIG. 4). The valve 94 would then be operated to allow flow through the open port and through the temporary outline hose/line, and to block flow through the other port that connects to discharge line 100.

According to another aspect for use of the valve 94, if it became necessary to bypass the pump assembly 50 (such as due to a need for repair or replacement), the pump connecting line 88 could be connected directly from the discharge side of the pump housing 60 to the open port of the valve 94 such that the micro-ingredient mixture/slurry is pumped through the valve 94 directly into the discharge line 100. If it became necessary to bypass the pump assembly 56, the pump connecting line 88 could be disconnected from the outlet of the pump housing 60 and connected directly to the outlet of the mixing tank resulting in pump assembly 50 being solely used for evacuating the mixing tank. Therefore, it should be apparent that the three way valve 94 can be used to accommodate operation of both of the pump assemblies or selected ones of the pump assemblies.

Liquid to be conveyed to the mixing tank, such as water, is received through system inlet 64 at manual inlet valve 68. Valve 68 connects to line 86 that extends downstream to carry the liquid to a plurality of intermediate and manually operated valves. Referring to FIG. 2, these intermediate valves include a pair of spray nozzle inlet valves 101, a mixing tank inlet valve 102, and a cleaning hose inlet valve 103. The cleaning hose inlet valve is normally placed in a closed position, and is opened only if necessary to hose down or clean the system 10, in which case the external cleaning hose 97 attached downstream of the valve 103 can be used. Downstream of the spray nozzle inlet valves 101 are a corresponding pair of spray nozzle inlet solenoid valves 105 that are used to automatically control the addition of liquid to the mixing tank through spray nozzle supply lines 96. The spray nozzle supply lines 96 are used to supply liquid to corresponding spray nozzles 116 connected to the spray nozzle supply lines 96 by fittings 114 (see FIG. 8). During a cleaning or flushing sequence of the system, the solenoid valves 105 may be activated to allow delivery of water through the lines 96 to the nozzles 116. The spray nozzles 116 may provide a high pressure spray to effectively clean the interior of the mixing tank, to include the lower exposed surfaces of the slide gate mechanisms 30 and the lower surface of the mixing tank cover 46. These nozzles 116 may be nozzles that spin so that the nozzles are capable of supplying high pressure overlapping streams of water to contact all areas within the mixing tank and the lower exposed surfaces of the mechanisms 30 and the top cover 46 of the tank.

Mixing tank inlet solenoid 104 is placed downstream of the mixing tank inlet valve 102. A mixing tank inlet line 99 (FIG. 2) interconnects the solenoid 104 with an outlet of the mixing tank 40 so that liquid can be delivered to the mixing tank during a micro-ingredient batching sequence. Accordingly, the solenoid valve 104 is selectively operated by the controller 32 to allow delivery of liquid through line 99 to the mixing tank according to a pre-designated recipe for a micro-ingredient batch that may require a specified amount of water to create a slurry mixture.

The particular construction of each of the storage bins 12 as shown in the preferred embodiment include upper bin sections 82, lower bin sections 84, and mounting brackets 74. Upper bin sections are sized to slidably fit within the lower bin sections. For example, the lower bin sections could each incorporate an internal stop flange located near the upper ends of the lower bins sections so that the upper bin sections could be inserted in the lower bin sections and supported by the respective stop flanges. The upper bin sections are an optional feature to increase the overall volume of selected ones of the bins in the event it is desired to selectively increase bin capacity.

In order to measure and track the amounts of micro ingredients used, the system may incorporate a "loss in weight" protocol in which amounts of micro-ingredients used are determined by incrementally recording loss in weight of each of the bins, and any components attached to the bins, such as the dispensing devices 14 and the motors 16. In this regard, the system may therefore incorporate the use of load cells that weigh each of the bins with components when loaded with pre-designated micro-ingredients, and then subsequent weight measurements are made during processing of the micro-ingredients to determine when the appropriate amounts of micro-ingredients are conveyed to the mixing tank for preparation of the designated micro-ingredient batch, as measured by the loss in weight of the bins. In the preferred embodiment shown, each of the bins 12 are independently suspended and separated from the other components of the system so that each bin may be continuously and independently weighed. More specifically, a horizontally extending load cell beam 76 is used to support a plurality of load cells, generally indicated in the drawings as load cells 78. The load cell beams 76 are rigidly mounted to the interior of the mobile unit, such as to the interior sides of the panels of the mobile unit. If the system is not mounted within a mobile unit, then the load cell beams can be mounted to another external rigid support, such as a support wall or divider positioned adjacent to the system. Each bin has at least one load cell positioned on opposite sides of the bin for recording the weight of the bin. Each bin is suspended or hung in a manner so that the entire weight of the bin is placed upon the corresponding load cells of the bin in order to determine an accurate weight for the bin, and each bin being physically separated from one another so that there is no contact between the bins which otherwise would interfere with accurate weighing of each of the bins. As further shown in the preferred embodiment, the mounting brackets 74 can be used to mount the respective bins to the supported load cells. For example, referring to FIG. 5, connecting elements, such as brackets or hooks 75, can be used to secure the bins to the supported load cells 78. Upper support brackets 77 may also be used to stabilize the connection between the upper bin sections 82 to the lower bin sections 84, so that if the upper bin sections are used, they are oriented in a manner that their mass is centered over the corresponding lower bin sections to ensure reliable weight measurements for the connected bin sections. These upper support brackets 77 as shown in figures reside above the load cells 78 and may be connected to the corresponding lower disposed mounting brackets 74 as by connecting plates 80. As further shown in the preferred embodiment, the mounting brackets 74, upper support brackets 77, and load cells 78 are disposed on opposite sides of the bins, along with the load cell beams 76, so that each of the bins are supported in an arrangement to weigh each of the bins with load cells located on opposite sides of each of the bins. It is noted that the front pair of bins 12 according to the view of Figure1 and other figures does not show the load cells 78, upper brackets 77, or load cell beams 76 for purposes of simplifying these drawings.

As mentioned, the use of separable upper and lower bin sections is advantageous to selectively control the size of the bins. The upper bin sections 82 bin sections may be mounted flush with a top cover or surface of the mobile unit, or may extend above the mobile unit, depending upon the size of the upper sections 82 chosen. The upper ends of the bins 12 also incorporate angled gratings or louvers 85 to prevent relatively large foreign objects from inadvertently entering the bins, and to also center micro-ingredients as they pass into the bins. These louvers may be sized in terms of spacing between the grating elements such that clumps of micro-ingredient materials cannot pass through gratings, the assumption being that the micro-ingredients are typically homogeneous materials with relatively small particle sizes. In this regard, the louvers 85 can also function as sieves so that the micro-ingredients contained within the bin have a predictable consistency, which in turn ensures that the dispensing devices can consistently meter amounts of the micro ingredients during operation. Referring to FIG. 7, this top plan view also illustrates the auger shafts 108 that are disposed to rotate thereby metering micro ingredients through the discharge openings 15.

Figure 9:
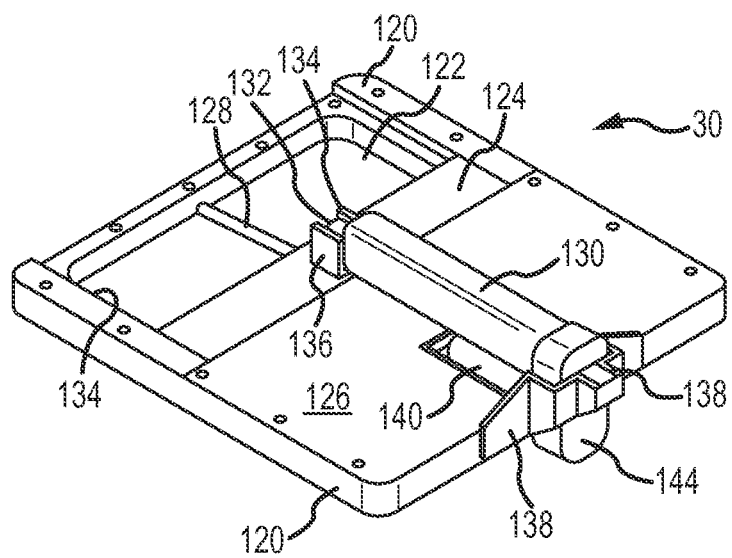
FIG. 9 is a perspective view of a slide gate mechanism.
Figure 10:
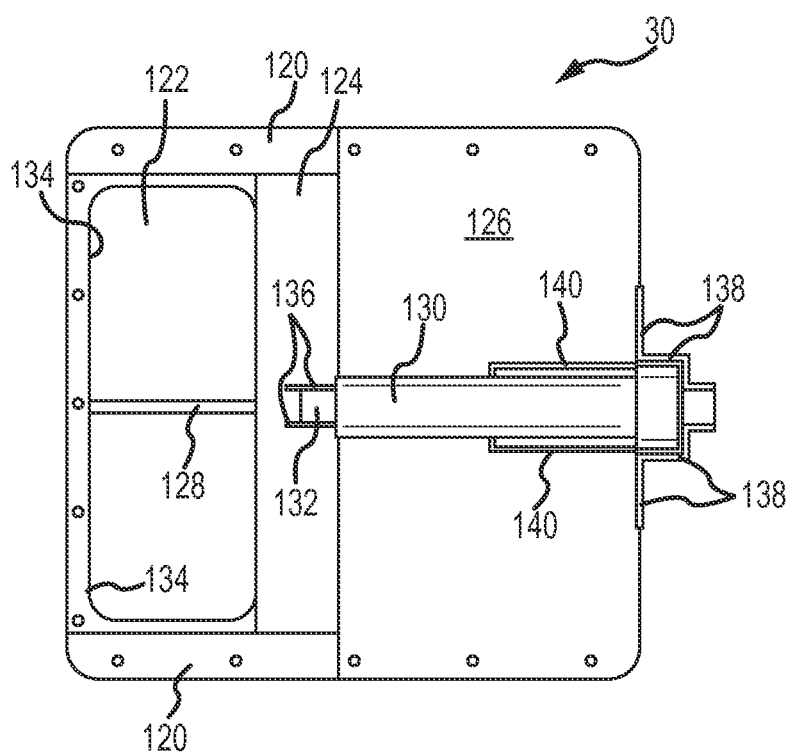
FIG. 10 is a top plan view of a slide gate mechanism.
Figure 11:
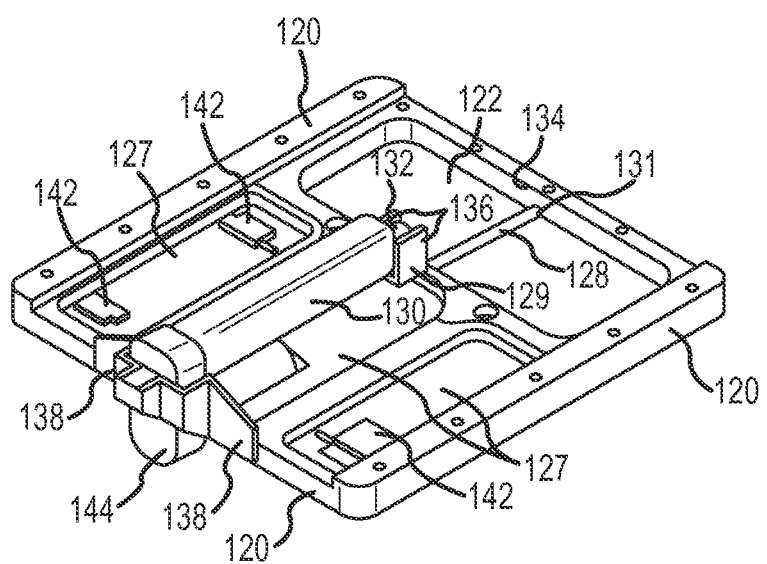
FIG. 11 is another perspective view of the slide gate mechanism with some components of the mechanism removed to reveal other components of the mechanism.

Referring to FIGS. 9-11, details of construction are illustrated for the slide gate mechanisms 30. A slide gate frame 120 is provided for mounting components of a slide gate mechanism 30. A gate opening 122 is exposed when a slidable gate 124 is withdrawn, defining an open position for the mechanism. More specifically, the slidable gate 124 is selectively slidable between a closed position in which the slidable gate 124 covers the opening 122, and an open position in which the slidable gate 124 is withdrawn to expose the opening 122. A top cover 126 is mounted over one end of the frame 120, and overlaps the slidable gate 124. A drain tube 128 is shown as having one end 129 connected to an interior side of the frame 120 (FIG. 11), with the opposite end 131 of the drain tube 128 extending adjacent to or mounted to an interior side of the frame at the opening 122. If the drain tube is mounted to the side of the frame, the drain tube has an opening (not shown) formed at end 131. The purpose of the drain tube 128 is for drainage of fluid that may build up within the interior frame pockets 127, which are hollow areas between the lower surface of the frame and the top cover 126. For example, during a cleaning cycle for the system, water may enter the pockets 127 when the slidable gates are open, thereby necessitating draining of the liquid to prevent corrosion and to prevent damage to components that may be mounted within the pockets 127. A slide gate actuator 130 is used to move the slidable gate 124 between the open and closed positions. The actuator 130 includes an extendable/retractable cylinder or piston 132. The exposed end of the cylinder 132 is attached to the slidable gate 124 as by brackets 136. The actuator 130 is mounted to the slide gate frame 120 by additional brackets 138. A cutout or slot 140 is formed on one end of the slide gate frame 120 (FIG. 11) to accommodate positioning of a solenoid 144 that may be used to control movement of the cylinder 132. An o-ring 134 lines the interior edge of the frame 120 that defines the gate opening 122. The O-ring is used to provide a seal between the slidable gate 124 and frame 120 when the slidable gate is in the closed position. This sealed arrangement between the slidable gate 124 and a frame 120 ensures there is no appreciable loss of airborne micro-ingredient particles during processing of micro-ingredients within the mixing tank, and also ensures that the mixing tank remains sealed from foreign objects that could inadvertently enter the tank during such processing. FIG. 11 illustrates the top cover 126 and the slidable gate 124 removed to expose the limit or proximity switches 142 that are used to indicate the position of the slidable gate 124. As shown, the switches 142 are mounted within the cavities 127. The limit switches 142 detect the position of the slidable gate 124, and this positional information is provided as an input to the master controller. Control signals are provided to each of the actuators 130 in the system in order to open or close the corresponding slidable gates 124 during system operation.

To summarize the flow of liquid through the system 10, liquid such as water enters through inlet 64, through manual valve 68 into inlet conveying line 86, through another optional manual valve 106, (FIG. 3) and through line 86 to valves 101, 102, and 103. Solenoid valves 104 and 105 control further flow of liquid into lines 96 and 99, respectively. Liquid entering the mixing tank 40 is provided either for use as liquid for creating a slurry mixture (during micro-ingredient batching), or for use to clean the interior of the mixing tank (during system flushing/cleaning). For liquid entering the mixing tank for purposes of micro-ingredient batching, it then travels from line 99 (see FIG. 6) into a T-fitting or connector 109. According to the view from FIG. 6, the T-fitting 109 has a left side extension/leg 111 that connects to the line 99 and a right side extension/leg 113 that connects to a quick connect/disconnect coupler 115. The third leg or extension of the T fitting 121 (see FIG. 5) attaches to the outlet 119 of the tank 40. The coupler 115 connects to the inlet side of the pump housing 60 as by interconnecting section 117. During typical micro-ingredient processing, the micro-ingredients will fill a portion of the volume of the mixing tank, but will leave enough room within the tank so that liquid may be added as necessary to fulfill particular batch requirements. In this way, liquid may be added to the mixing tank through the outlet and the liquid will remain within the mixing tank during processing. As shown best in FIG. 4, potential overfill of the mixing tank with liquid can be prevented based upon the arrangement shown with respect to the line 88 and the position of the pump housing 60. More specifically, in the event excess liquid enters the mixing tank, the fluid can be taken up within the pump housing 60 and the line 88 which is located below the elevation of the upper edge of the mixing tank. Additionally, other process controls may be incorporated on the mixing tank to prevent under-fill or overfill, such as liquid level switches which can also be used to precisely control processing of the micro-ingredients within a specified recipe for batch. For example, a particular batch of micro-ingredients may specify that based precise amount of liquid be added to create the slurry mixture. In such case, the mixing tank can incorporate a plurality of liquid level switches located at different elevations within the tank which indicate the amount of liquid that has entered the tank.

When it is desired to empty or evacuate the contents of the mixing tank 40 after a batch of micro-ingredients have been prepared, the pump assemblies 50 and 56 can be operated to evacuate the contents of the tank, and to evacuate micro-ingredients in the any other sections of the fluid conveying path that may have any residual amounts of micro-ingredients, such as micro-ingredients within the T connector 109, or residual amounts of micro-ingredients that may have backed up into the line 99. After the micro-ingredients have been evacuated, it may be desirable to "chase" the micro-ingredients with additional liquid to ensure that all of the micro-ingredients have been evacuated through the system and carry downstream. In many feed call batches, that is, those feed batches to which the micro-ingredients are to be added within the facility in which the system is installed, many such feed batches require additional water so that the additional liquid added as "chasing" liquid does not interfere with the final feed batch to which the micro-ingredients are added.

It is also contemplated that flow meters can be incorporated within the system at both the inlet and discharge of the system so that precise amounts of liquid are tracked. In this regard, information regarding amounts of liquid used can be provided to the operator of the facility so that the operator may also plan as to how much additional water should be added to a particular feed call batch in order to meet the requirements/specifications of such batch.

Returning to a description of the flow path of liquid through the system, from pump housing 60, the liquid travels through pump interconnection line 88 into the inlet side of pump housing 54. As seen best in FIG. 6, prior to liquid traveling through the interconnection line 88, it flows through intermediate connection/elbow 89 as shown, which in turn connects to another quick connect/disconnect coupler 123 secured to one end of the line 88. After passing through line 88, fluid passes through the three way valve 94, into the pump discharge line 100, and out of the system through discharge 66 at discharge valve 70. Additional discharge points can be designated or configured, such as by disconnecting the line 88 from the valve 94, and connecting it to another discharge point as required.

FIGS. 12-17 illustrate the system 10 mounted within a mobile cart or cabinet, generally indicated at 150. The cabinet has a lower platform or base 151 to support the components of the system 10. If it is desired to make the cabinet mobile, wheels 162 can be attached to the base 151. The cabinet 150 includes opposing side panels 158 which cover at least two sides of the system 10. The front side of the cabinet includes a control panel 152 that may be used to house components of the master controller 32, such as an input/output module (not shown) and the processor 33. The user interface 34 can be located remote from the cabinet, along with input devices used to communicate with the controller. In this regard, a remote placement of user interfaces and input devices may be configured to wirelessly communicate with the processor and input/output module. The other sides of the cabinet may also include respective side panels (not shown), and these side panels may be removable so that an operator may view the system 10 during operation and/or to conduct maintenance on the system. Steps 154 may be mounted on one or more of the sides of the cabinet in order to ease access to the bin openings.

Figure 12:
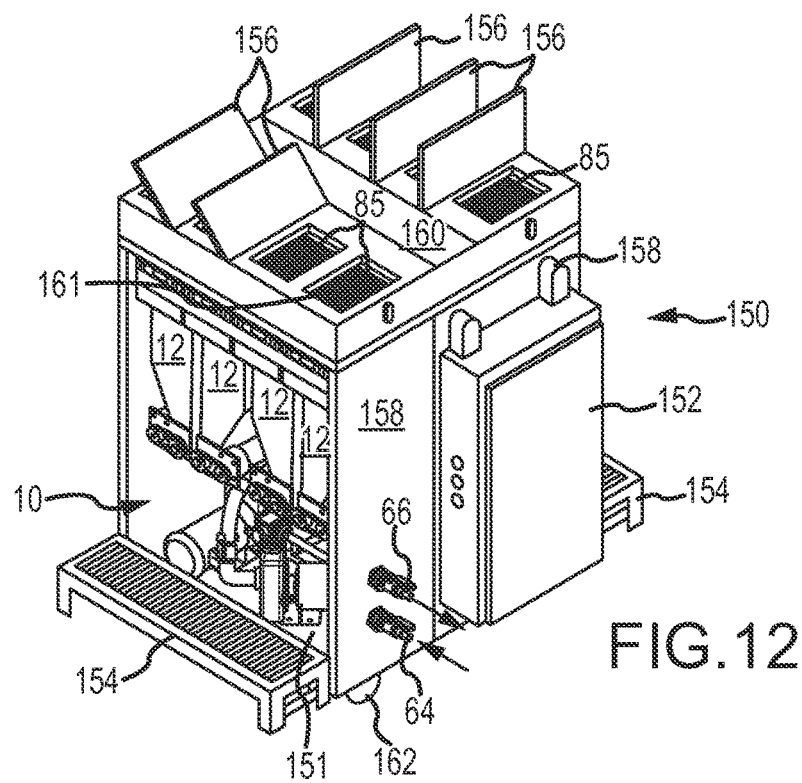
FIG. 12 is a perspective view of a mobile cart or cabinet used to house the system.
Figure 13:
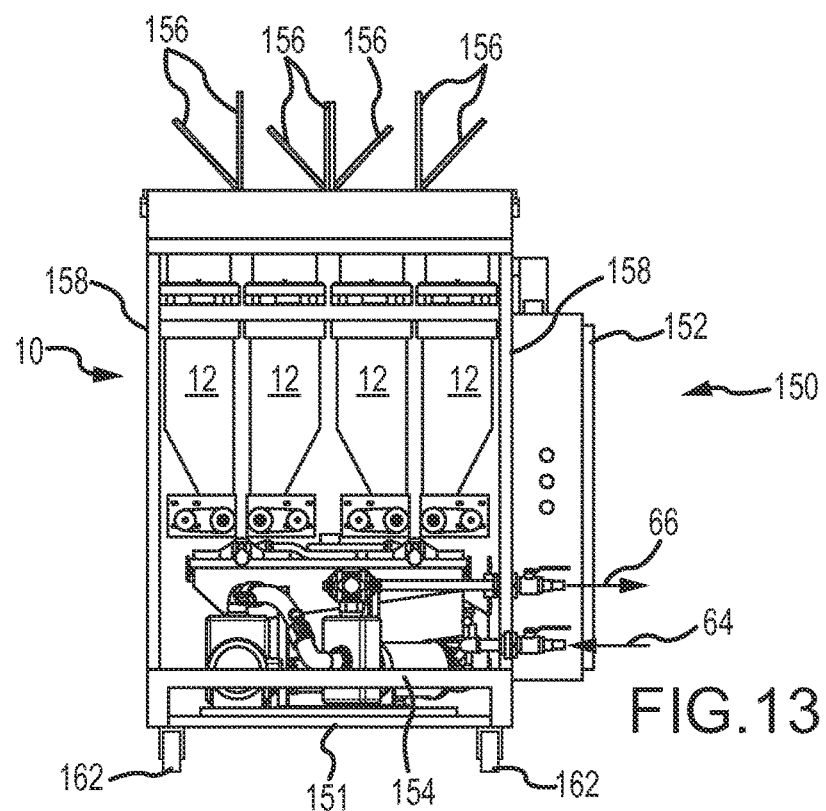
FIG. 13 is a left side view of the mobile cart of FIG. 12.
Figure 14:
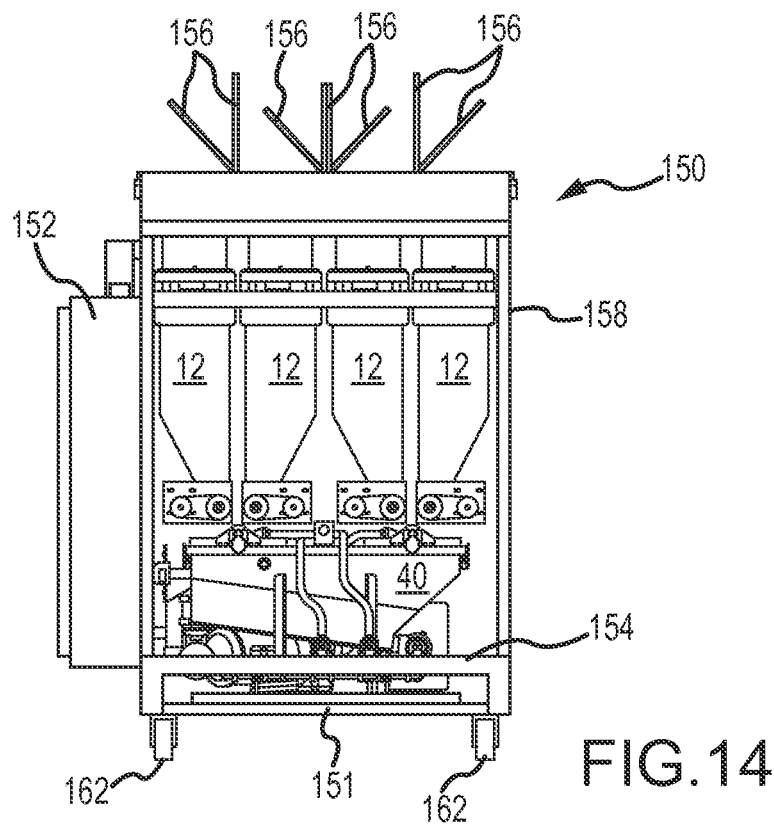
FIG. 14 right side view of the mobile cart of FIG. 12.
Figure 15:
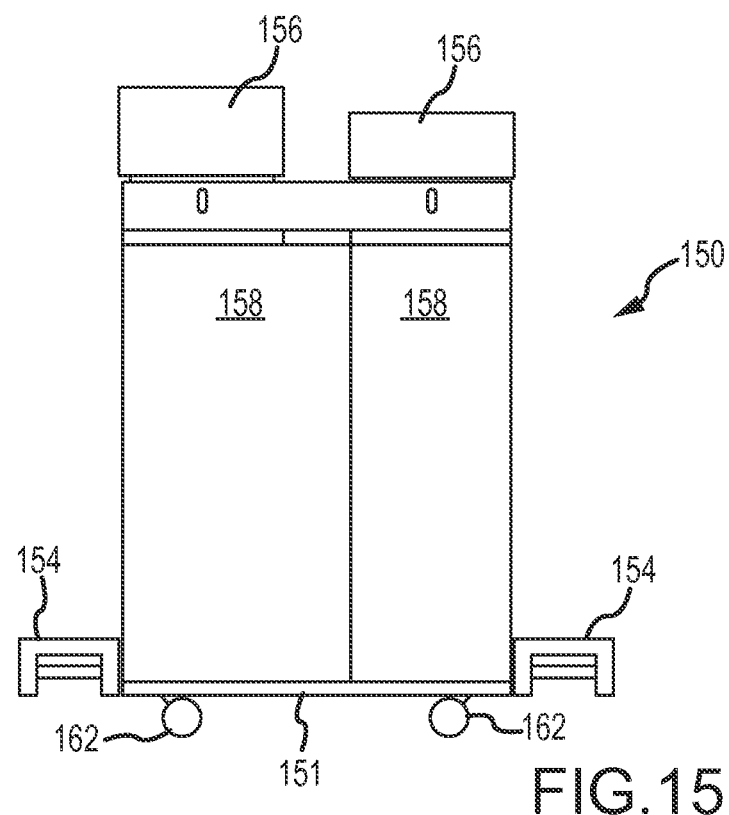
FIG. 15 is a rear elevation view of the mobile cart of FIG. 12.
Figure 16:
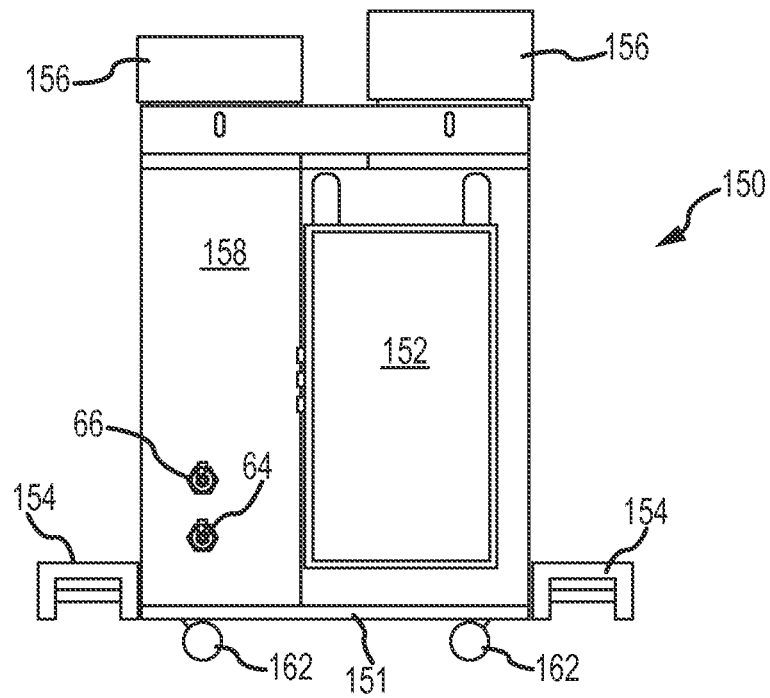
FIG. 16 is a front elevation view of the mobile cart of FIG. 12.
Figure 17:
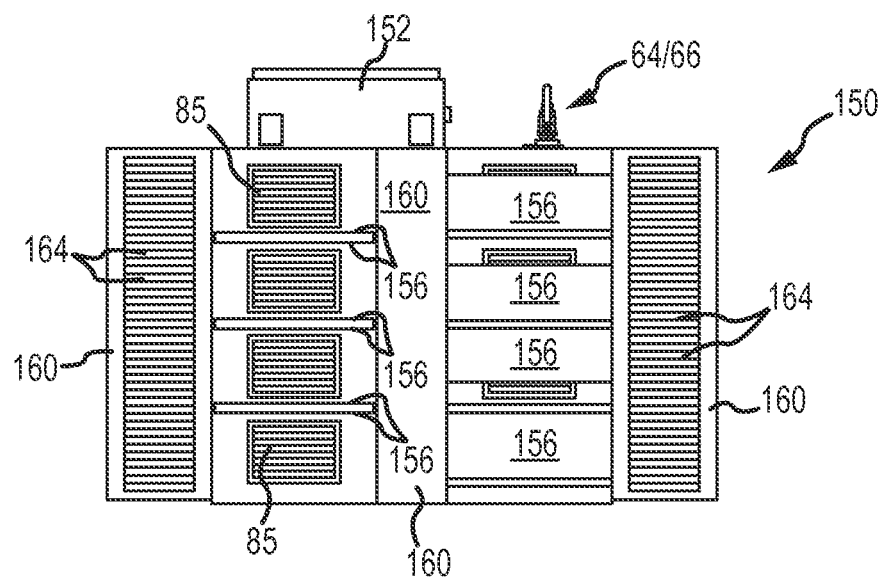
FIG. 17 is a top plan view of the mobile cart of FIG. 12.

Bin covers 156 are provided for each of the upper ends of the bins 12. The bin covers may be hingedly mounted between adjacent bins. For illustration purposes, FIG. 12 shows two of the bin covers 156 removed, and the location 161 on the top panel 160 where the bin covers 156 can be mounted. According to the arrangement shown, when a bin cover is opened, it will at least partially block access to the adjacent bin, which assists to prevent spillage of micro-ingredient into the adjacent bin. Preferably, only one of the bin covers is opened at any time when adding micro-ingredients to prevent cross contamination between the bins. Nonetheless, the arrangement of the bin covers as shown in which hinged ends of the bins located between the bins helps to avoid cross contamination. FIG. 17 also shows vents 164 formed on the top panel 160. These vents can be used to dissipate heat generated from the system 10, and may be particularly useful if side panels 158 enclose all sides of the cabinet during operation.

According to a method of the invention, a micro-ingredient preparations system is provided in which micro-ingredients are stored within a designated storage bins, and thus dispensing device is provided for each of the bins to dispense micro-ingredients into a receiving receptacle, such as a mixing tank. Micro-ingredients are delivered to the receiving receptacle as determined by a recipe, the recipe being executed by a controller that communicates with the dispensing devices. One or more slide gate mechanisms are positioned adjacent the bins such that at least one gate opening controls access to the interior of the mixing tank with respect to micro-ingredients dispensed from one or more of the dispensing devices. The control also operates the slide gate mechanisms such that airborne micro-ingredient particles are prevented from escaping the mixing tank during operation. Also, in the event of equipment failure or an alarm condition, the slide gate mechanisms are operated to prevent loss or contamination of micro-ingredients. In one example of the method, the slide gate mechanisms are closed and sealed after the prescribed amount of a micro-ingredient is dispensed from the one or more storage bins mounted over the respective slide gates. Slide gates are opened when it is desired to allow the micro-ingredients to move from the dispensing devices into the mixing tank. In yet another example of the method, during an alarm condition such as when it is determined that an improper micro-ingredient may have been delivered to the mixing tank, or may be delivered to the mixing tank, the slide gate mechanisms can be moved to the closed position as an interlock or safe mode feature to prevent micro-ingredients from entering the mixing tank until the alarm condition has been resolved. Other examples of alarm conditions could include failure of system components, such as failure of one or more of the load cells, failure of one or more of the dispensing devices, or cross contamination situations that could occur in loading the bins. It shall be understood however that these are not all of the potential alarm conditions that could exist and therefore, the method of the invention includes use of the slide gate mechanisms as interlocks during any applicable alarm condition in which it is determined that the mixing tank should not receive any further micro-ingredients until the alarm condition is resolved.

In another preferred embodiment of the invention, it includes a sub-combination in which the slide mechanisms can be used in any type of product delivery system in which it is desired to control loss of product caused by the product becoming airborne. Therefore, it is contemplated that the slide gate mechanisms of this invention can be used with other types of systems in which a product is delivered to a receiving receptacle having an opening to receive the products, and in which it is desirable to cover and seal the opening to prevent product loss.

Yet further, in another preferred embodiment of the invention, it includes a sub-combination in which the slide gate mechanisms can be used to prevent access to a receiving receptacle during operation when an alarm condition is present, and it is determined that the receiving receptacle should be closed and sealed. In this aspect of the invention, it provides an interlock or safe mode feature in which the slide gate mechanisms are used to physically control access to the receiving receptacle.

The foregoing discussion of the invention has been presented for purposes of illustration and description. Further, the description is not intended to limit the invention to the forms disclosed herein. Consequently, variations and modifications commensurate with the above teachings, within the skill and knowledge of the relevant art are within the scope of the present invention. The embodiments described herein are further intended to explain the best mode presently known of practicing the invention and to enable others skilled in the art to utilize the invention and other various modifications required by their particular application or use of the invention. Thus, it is intended that the claims be construed to include the alternative embodiments to the extent permitted by the prior art.

What is claimed is:

1. A system for preparing micro-ingredients to be used in designated feed rations, said system comprising:

at least one bin for holding a micro-ingredient therein, said bin having an opening for receiving the micro-ingredient;
a dispensing device communicating with the at least one bin for dispensing the micro-ingredient from the at least one bin;
a receiving receptacle for receiving the micro-ingredient dispensed;
a slide gate mechanism mounted to the receiving receptacle, the slide gate mechanism having a gate being operable between a closed position and an open position, the open position defining an opening through the mechanism enabling a micro-ingredient to be transferred from the dispensing device into the receiving receptacle, and the closed position defining a closure of the mechanism to prevent the micro-ingredient from being transferred from the dispensing device into the receiving receptacle; and
a controller communicating with said dispensing device and said slide gate mechanism, said controller including a micro-processor, computer coded instructions determining operation of the system, and an interface for placing said slide gate mechanism between the open and closed positions based on commands of said computer coded instructions resulting in output control signals sent to said slide gate mechanism.

2. A system, as claimed in claim 1, wherein:
said controller comprises a PLC.

3. A system, as claimed in claim 1, wherein:
micro-ingredient recipes are used to determine (a) which micro-ingredients are to be added to the receiving receptacle, (b) quantities of the micro-ingredients to be added, and (c) how the micro-ingredients are to be processed prior to delivery to a designated feed ration, and said micro-ingredient recipes being programmed in said computer coded instructions for execution by said micro-processor resulting in said output signals being generated.

4. A system, as claimed in claim 1, wherein:
said system includes at least two bins and each bin having a corresponding dispensing device for dispensing micro-ingredients through said slide gate mechanism oriented below the dispensing devices.

5. A system, as claimed in claim 1, wherein:
said system includes at least two bins, each bin having a corresponding bin cover that covers access to an open top of each bin, each bin cover rotatably mounted between the at least two bins, wherein opening of either of said bin covers orients said opened bin cover to extend upward and thereby partially blocking access to the other bin.

6. A system, as claimed in claim 1, further including:
a weighing element associated with each bin and communicating with said controller to determine the weight of each bin during operation.

7. A system, as claimed in claim 6, wherein:
said weighing element includes a load cell mounted to its corresponding bin for generating signals to said controller to determine the weight of said bin.

8. A system, as claimed in claim 1, further including:
at least one pump and associated fluid conveying lines communicating with said receiving receptacle for transferring fluid into said receiving receptacle, and for transferring micro-ingredients combined with said fluid as a micro-ingredient recipe from said receiving receptacle for subsequent use in a designated feed ration.

9. A system, as claimed in claim 1, further including:
at least one pump and associated fluid conveying lines communicating with said receiving receptacle for transferring fluid into said receiving receptacle, and for transferring said fluid from said receiving receptacle during a cleaning cycle to clean an interior of the receiving receptacle after preparation of a micro-ingredient recipe in said receiving receptacle.

10. A system, as claimed in claim 9, further including:
at least one nozzle disposed within said receiving receptacle and communicating with said fluid conveying line to distribute fluid in said receiving receptacle during cleaning.

11. A system, as claimed in claim 1, wherein:
said receiving receptacle includes a mixing tank and a mixing shaft disposed in said tank for controlled mixing of micro-ingredients in said tank.

12. A system, as claimed in claim 8, wherein:
said at least one pump includes two pumps arranged in series, and a three-way valve communicating with said pumps for selective conveying of said fluid.

13. A system, as claimed in claim 1, wherein:
said slide gate mechanism includes a slidable gate and an actuator controlled by said controller for moving said slidable gate between said open position, and said closed position.

14. A system, as claimed in claim 13, wherein:
said slide gate mechanism includes a seal located around a periphery of an opening formed in said frame and covered by said slidable gate when placed in said closed position thereby sealing said slidable gate to said frame.

15. A system, as claimed in claim 1, wherein:
said slide gate mechanism includes (a) a frame, (b) a slidable gate mounted to said frame and slidable along said frame, (c) an actuator controlled by said controller for moving said slide gate mechanism between a first position corresponding to said open position, and a second position corresponding to said closed position, and (d) a top cover mounted on said frame.

* * * * *